US012688398B2

(12) United States Patent
Hasumi et al.

(10) Patent No.: US 12,688,398 B2
(45) Date of Patent: Jul. 21, 2026

(54) TRAINING DATA GENERATING SYSTEM, METHOD, COMPUTER-READABLE MEDIUM, MODEL GENERATING SYSTEM, AND LOG GENERATING SYSTEM

(71) Applicant: NEC Corporation, Tokyo (JP)

(72) Inventors: Daichi Hasumi, Tokyo (JP); Shigeyoshi Shima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 559 days.

(21) Appl. No.: 18/273,479

(22) PCT Filed: Jan. 28, 2021

(86) PCT No.: PCT/JP2021/002979
§ 371 (c)(1),
(2) Date: Jul. 20, 2023

(87) PCT Pub. No.: WO2022/162820
PCT Pub. Date: Aug. 4, 2022

(65) Prior Publication Data
US 2024/0119259 A1 Apr. 11, 2024

(51) Int. Cl.
*G06N 3/044* (2023.01)
*G06N 3/08* (2023.01)

(52) U.S. Cl.
CPC ............... *G06N 3/044* (2023.01); *G06N 3/08* (2013.01)

(58) Field of Classification Search
CPC .................................................... G06N 3/044
See application file for complete search history.

(56) References Cited

U.S. PATENT DOCUMENTS

| | | | |
|---|---|---|---|
| 9,443,192 B1 | 9/2016 | Cosic | |
| 2012/0011487 A1* | 1/2012 | Matsumoto | ......... G06F 11/3668 |
| | | | 717/104 |

(Continued)

FOREIGN PATENT DOCUMENTS

| | | |
|---|---|---|
| JP | H08-76955 A | 3/1996 |
| JP | 5926872 B1 | 5/2016 |
| JP | 2016-110251 A | 6/2016 |

OTHER PUBLICATIONS

JP Office Action for JP Application No. 2022-577906, mailed on Apr. 23, 2024 with English Translation.

(Continued)

*Primary Examiner* — Simon P Kanaan
(74) *Attorney, Agent, or Firm* — Sughrue Mion, PLLC

(57) ABSTRACT

A training data generating system includes an existing tag information acquiring unit, a target tag information acquiring unit, a selecting unit, and a training data generating unit. The existing tag information acquiring unit identifies, as an existing application, an application for which training data for a user operation model has already been generated based on a user operation history and, for each existing application, acquires tag information indicating a feature of the application as existing tag information. The target tag information acquiring unit acquires tag information of a target application as target tag information. The selecting unit calculates a degree of similarity between the target tag information and each piece of the existing tag information and, based on the degree of similarity, selects a similar application from the existing applications. The training data generating unit generates training data for the target application from training data for the similar application.

13 Claims, 16 Drawing Sheets

(56)        References Cited

U.S. PATENT DOCUMENTS

| | | | | | |
|---|---|---|---|---|---|
| 2019/0188566 | A1* | 6/2019 | Schuster | ................ | G06N 20/00 |
| 2021/0049274 | A1* | 2/2021 | Ikeda | ................... | G06F 18/217 |
| 2021/0125104 | A1* | 4/2021 | Christiansen | ......... | G06N 20/00 |
| 2021/0357749 | A1* | 11/2021 | Kim | ........................ | G06N 3/04 |

OTHER PUBLICATIONS

International Search Report for PCT Application No. PCT/JP2021/002979, mailed on Apr. 6, 2021.

* cited by examiner

| TIME | APPLICATION ID | USER OPERATION TYPE | |
|---|---|---|---|
| | | USER OPERATION CLASSIFICATION | TARGET |
| ... | ... | ... | ... |
| 2020/01/10 12:34:01 | APP6 | Edit File | C:¥Users¥UN¥Documents¥example.docx |
| 2020/01/10 12:34:05 | APP2 | Open | https://hoge.com |
| 2020/01/10 12:35:56 | APP6 | Edit File | C:¥Users¥UN¥Documents¥example.docx |
| ... | ... | ... | ... |

Fig. 4

| APPLICATION ID |
| :---: |
| APP1 |
| APP2 |
| APP3 |
| APP4 |
| APP5 |
| APP6 |
| APP7 |
| APP8 |

Fig. 5

| APPLICATION ID | USER OPERATION ID | REAL OPERATION TEMPLATE |
|:---:|:---:|:---:|
| APP1 | OP11 | TMP11 |
| | OP12 | TMP12 |
| | ... | ... |
| APP2 | OP21 | TMP21 |
| | OP22 | TMP22 |
| | ... | ... |
| ⋮ | ⋮ | |

Fig. 6

| APPLICATION ID | | TAG INFORMATION | | |
|---|---|---|---|---|
| APP1 | File Management | Preinstalled | Daily Used | NONE | NONE |
| APP2 | Web Browser | Daily Used | Preinstalled | NONE | NONE |
| APP3 | Web Browser | Daily Used | NONE | NONE | NONE |
| APP4 | Text Editor | Frequently Used | Open Text File | Preinstalled | NONE |
| APP5 | Text Editor | Sometimes Used | Open Text File | NONE | NONE |
| APP6 | Word Processor | Daily Used | Open Document File | Open Text File | Microsoft Office |
| APP7 | Word Processor | Daily Used | Open Document File | Open Text File | NONE |
| APP8 | IDE | Sometimes Used | Open SLN File | Language Type: C | Language Type: C++ |

Fig. 7

SUPPLEMENTAL APPLICATION ID= "APP5"

| EXISTING APPLICATION ID | DEGREE OF SIMILARITY |
|---|---|
| APP1 | 0.00 |
| APP2 | 0.00 |
| APP3 | 0.00 |
| APP4 | 0.86 |
| APP6 | 0.25 |
| APP7 | 0.29 |
| APP8 | 0.00 |

Fig. 9

SUPPLEMENTAL APPLICATION ID= "APP3"

| EXISTING APPLICATION ID | DEGREE OF SIMILARITY |
|---|---|
| APP1 | 0. 40 |
| APP2 | 0. 80 |
| APP4 | 0. 00 |
| APP5 | 0. 00 |
| APP6 | 0. 29 |
| APP7 | 0. 33 |
| APP8 | 0. 00 |

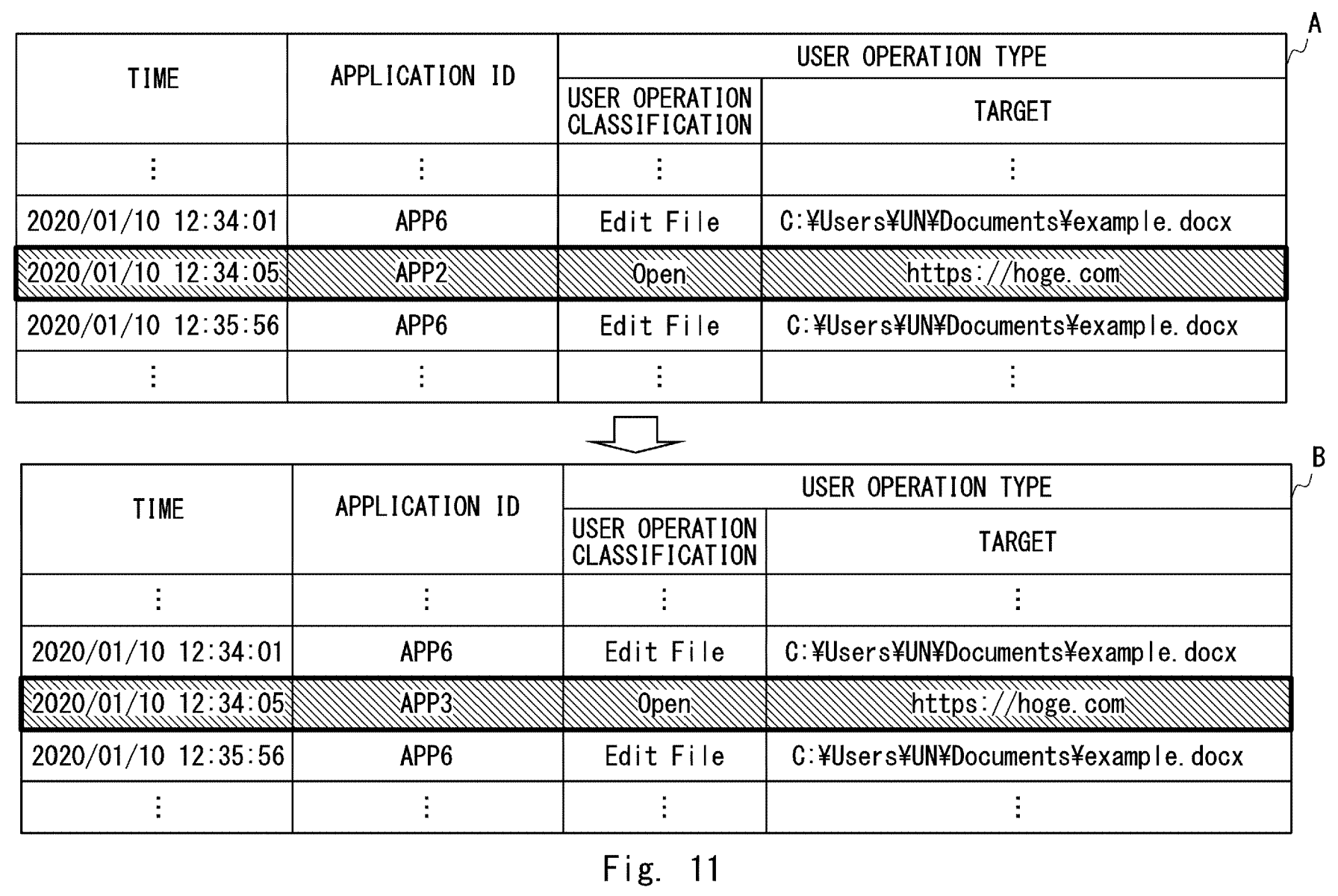

| TIME | APPLICATION ID | USER OPERATION TYPE | |
|---|---|---|---|
| | | USER OPERATION CLASSIFICATION | TARGET |
| ... | ... | ... | ... |
| 2020/01/10 12:34:01 | APP6 | Edit File | C:¥Users¥UN¥Documents¥example.docx |
| 2020/01/10 12:34:05 | APP2 | Open | https://hoge.com |
| 2020/01/10 12:35:56 | APP6 | Edit File | C:¥Users¥UN¥Documents¥example.docx |
| ... | ... | ... | ... |

⇒

B

| TIME | APPLICATION ID | USER OPERATION TYPE | |
|---|---|---|---|
| | | USER OPERATION CLASSIFICATION | TARGET |
| ... | ... | ... | ... |
| 2020/01/10 12:34:01 | APP6 | Edit File | C:¥Users¥UN¥Documents¥example.docx |
| 2020/01/10 12:34:05 | APP3 | Open | https://hoge.com |
| 2020/01/10 12:35:56 | APP6 | Edit File | C:¥Users¥UN¥Documents¥example.docx |
| ... | ... | ... | ... |

Fig. 11

| APPLICATION ID | USER OPERATION ID | LOG TEMPLATE |
|:---:|:---:|:---:|
| | OP11 | L11 |
| APP1 | OP12 | L12 |
| | ... | ... |
| | OP21 | L21 |
| APP2 | OP22 | L22 |
| | ... | ... |
| ⋮ | ⋮ | |

Fig. 15

TRAINING DATA GENERATING SYSTEM, METHOD, COMPUTER-READABLE MEDIUM, MODEL GENERATING SYSTEM, AND LOG GENERATING SYSTEM

This application is a National Stage Entry of PCT/JP2021/002979 filed on Jan. 28, 2021, the contents of all of which are incorporated herein by reference, in their entirety.

TECHNICAL FIELD

The present disclosure relates to training data generating systems, methods, computer-readable media, model generating systems, and log generating systems.

BACKGROUND ART

In recent years, damage, such as information breach or cessation of business, caused by cyberattacks targeting organizations is on the rise, and there is a demand for enhanced measures against cyberattacks. In order to provide enhanced measures against such cyberattacks, it is indispensable to improve investigative skills of those in charge of security of systems. For this purpose, cybersecurity exercises are conducted in which an attendee is tasked to locate a log of an incident that can be traced to a cyberattack (referred to below as "attack log") from among logs of normal business operations unrelated to the incident (referred to below as "normal log"). Hence, for such a cybersecurity exercise, normal logs, in addition to attack logs, need to be prepared in advance.

Conducting cybersecurity exercises requires a massive number of normal logs. For one reason, in order to improve his or her investigative skills, an attendee needs to participate in cybersecurity exercises multiple times, but an attendee cannot improve his or her investigative skills if the same normal logs are reused, and thus new normal logs need to be prepared for each exercise. Creating normal logs manually or recording logs of normal business operations at a terminal in a presupposed environment requires extended time and tedious work.

Accordingly, it has been proposed to create a model from an operation history of a real terminal observed over a predefined period and generate a normal log by predicting a user operation by the model. Such a model may be called a user operation model. Patent Literature 1 discloses a technique for creating a test pattern, an operation pattern in a new system, based on a job-type-by-job-type operation history in an old system.

CITATION LIST

Patent Literature

Patent Literature 1: Japanese Unexamined Patent Application Publication No. 2016-110251

SUMMARY OF INVENTION

Technical Problem

Patent Literature 1 mentioned above, however, is silent as to a specific technique for creating a test pattern. Furthermore, an application is often updated on a real terminal, or often a new application is installed on a real terminal. Therefore, acquiring an operation history from a real terminal and creating a model each time an application is updated or installed require too much time and work in practice, posing a problem of inefficiency.

Thus, there is a demand for a technique for efficiently constructing, from an existing user operation model, a user operation model that corresponds to a new application. Accordingly, in view of such circumstances, the present disclosure is directed to providing a training data generating system and so forth that can efficiently construct a user operation model that corresponds to a new application.

Solution to Problem

A training data generating system according to one aspect of the present disclosure includes existing tag information acquiring means, target tag information acquiring means, selecting means, and training data generating means. The existing tag information acquiring means is configured to identify, as an existing application, an application for which training data for generating a user operation model that estimates a user operation in an application has already been generated based on a user operation history. The existing tag information acquiring unit is further configured to, for each existing application, acquire tag information indicating a feature of the existing application as existing tag information. The target tag information acquiring means is configured to, for a target application, acquire tag information indicating a feature of the target application as target tag information. The selecting means is configured to calculate a degree of similarity between the target tag information and each piece of the existing tag information, and select, from the existing applications, a similar application similar to the target application based on the degree of similarity. The training data generating means is configured to generate training data for the target application from training data for the similar application.

A training data generating method according to one aspect of the present disclosure includes an existing tag information acquiring step, a target tag information acquiring step, a selecting step, and a training data generating step. The existing tag information acquiring step is a step of identifying, as an existing application, an application for which training data for generating a user operation model that estimates a user operation in an application has already been generated based on a user operation history. The existing tag information acquiring step is further a step of, for each existing application, acquiring tag information indicating a feature of the existing application as existing tag information. The target tag information acquiring step is a step of, for a target application, acquiring tag information indicating a feature of the target application as target tag information. The selecting step is a step of calculating a degree of similarity between the target tag information and each piece of the existing tag information, and selecting, from the existing applications, a similar application similar to the target application based on the degree of similarity. The training data generating step is a step of generating training data for the target application from training data for the similar application.

A non-transitory computer-readable medium according to one aspect of the present disclosure stores a program that causes a computer to execute an existing tag information acquiring process, a target tag information acquiring process, a selecting process, and a training data generating process. The existing tag information acquiring process is a process of identifying, as an existing application, an application for which training data for generating a user operation model that estimates a user operation in an application has already been generated based on a user operation history. The existing tag information acquiring process is further a process of, for each existing application, acquiring tag information indicating a feature of the existing application as existing tag information. The target tag information acquiring process is a process of, for a target application, acquiring tag information indicating a feature of the target application as target tag information. The selecting process is a process of calculating a degree of similarity between the target tag information and each piece of the existing tag information, and selecting, from the existing applications, a similar application similar to the target application based on the degree of similarity. The training data generating process is a process of generating training data for the target application from training data for the similar application.

Advantageous Effects of Invention

The present disclosure can provide a training data generating system and so forth that can efficiently construct a user operation model that corresponds to a new application.

BRIEF DESCRIPTION OF DRAWINGS

FIG. 4 shows one example of a data structure of training data according to the second example embodiment;

FIG. 5 shows one example of a data structure of an application list according to the second example embodiment;

FIG. 6 shows one example of a data structure of a real operation rule storage unit according to the second example embodiment;

FIG. 7 shows one example of a data structure of a tag adding rule storage unit according to the second example embodiment;

FIG. 9 is an illustration for describing one example of a degree of similarity calculating and selecting process according to the second example embodiment;

FIG. 10 is an illustration for describing another example of a degree of similarity calculating and selecting process according to the second example embodiment;

FIG. 11 is an illustration for describing a supplemental training data generating process according to the second example embodiment;

FIG. 15 shows one example of a data structure of a correspondence table according to the third example embodiment.

EXAMPLE EMBODIMENT

Figure 1:
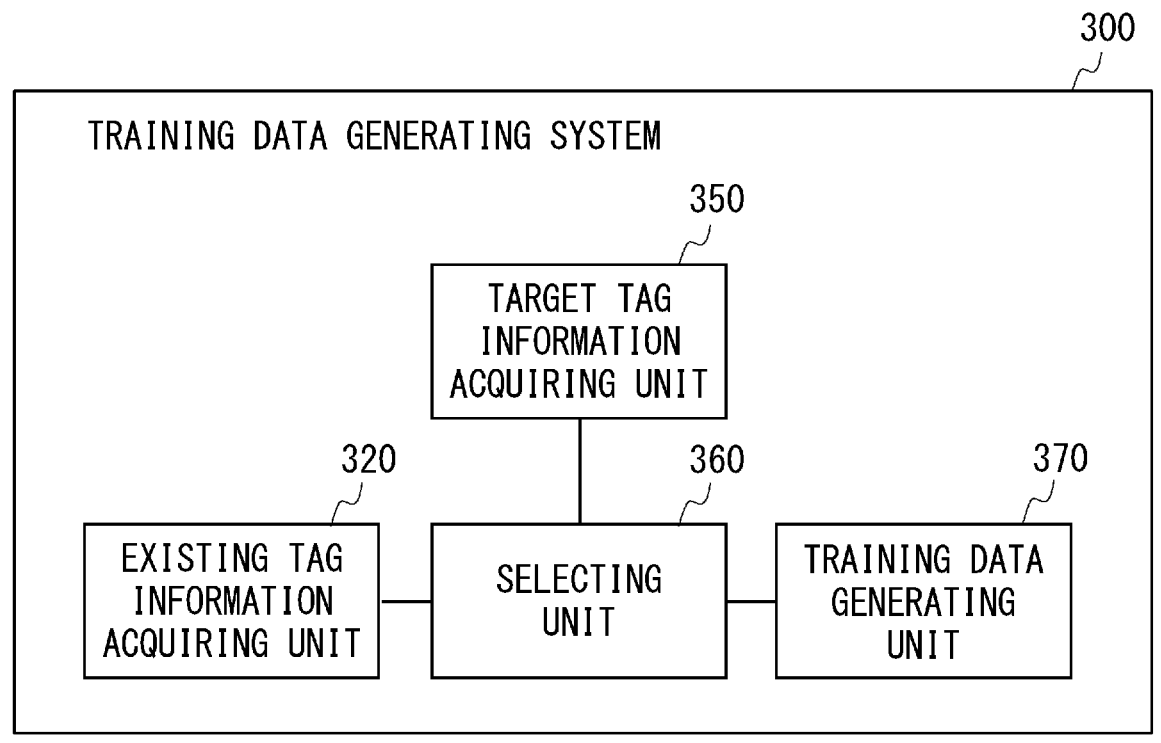
FIG. 1 is a block diagram showing a configuration of a training data generating system according to a first example embodiment.

Hereinafter, the present disclosure will be described through example embodiments, but the following example embodiments do not limit the disclosure set forth in the claims. Not all the configurations described in the example embodiments are essential as means for solving the problem. In the drawings, identical elements are given identical reference characters, and their repetitive description will be omitted as necessary.

First Example Embodiment

First, a first example embodiment of the present disclosure will be described. FIG. 1 is a block diagram showing a configuration of a training data generating system 300 according to the first example embodiment. The training data generating system 300 is a computer system that generates training data for training a user operation model. A user operation model is a model that estimates an operation of a user (user operation) to be performed to execute a specific process in an application. Herein, an application for which corresponding training data has already been generated is referred to as an existing application. That corresponding training data has already been generated encompasses that corresponding training data has been generated in an amount necessary to train a user operation model. An application for which corresponding training data is still insufficient is referred to as a target application. That corresponding training data is still insufficient encompasses that there is no corresponding training data or that the amount of corresponding training data does not meet the amount necessary to train a user operation model. The training data generating system 300 functions as a training data expanding system that expands training data by generating training data for a target application from already generated training data for another application.

The training data generating system 300 includes an existing tag information acquiring unit 320, a target tag information acquiring unit 350, a selecting unit 360, and a training data generating unit 370.

The existing tag information acquiring unit 320 identifies, as an existing application, an application for which training data has already been generated, based on a user operation history that shows a history of user operations. For each existing application, the existing tag information acquiring unit 320 acquires, as existing tag information, tag information that indicates a feature of the existing application. Tag information is information that indicates one or more individual tags classifying a feature of an application. One or more individual tags are set in advance for each of a plurality of applications by an administrator or an engineer of the application.

For a target application, the target tag information acquiring unit 350 acquires, as target tag information, tag information that indicates a feature of the target application.

The selecting unit 360 calculates the degree of similarity between target tag information and each piece of existing tag information. Based on the degrees of similarity, the selecting unit 360 selects, from existing applications, a similar application that is similar to a target application.

The training data generating unit 370 generates training data for a target application from training data for a similar application.

In this manner, according to the first example embodiment, the training data generating system 300 generates training data for a new application for which training data for training a user operation model is insufficient, by making use of training data for a similar application. The training data generating system 300 does so because applications with similar features are likely to have similar tendencies in how they are operated by a user. Therefore, the training data generating system 300 can generate training data with ease without acquiring an operation history by having a user operate a new application on a real terminal. Accordingly, a user operation model corresponding to a new application can be constructed efficiently.

Second Example Embodiment

Figure 2:
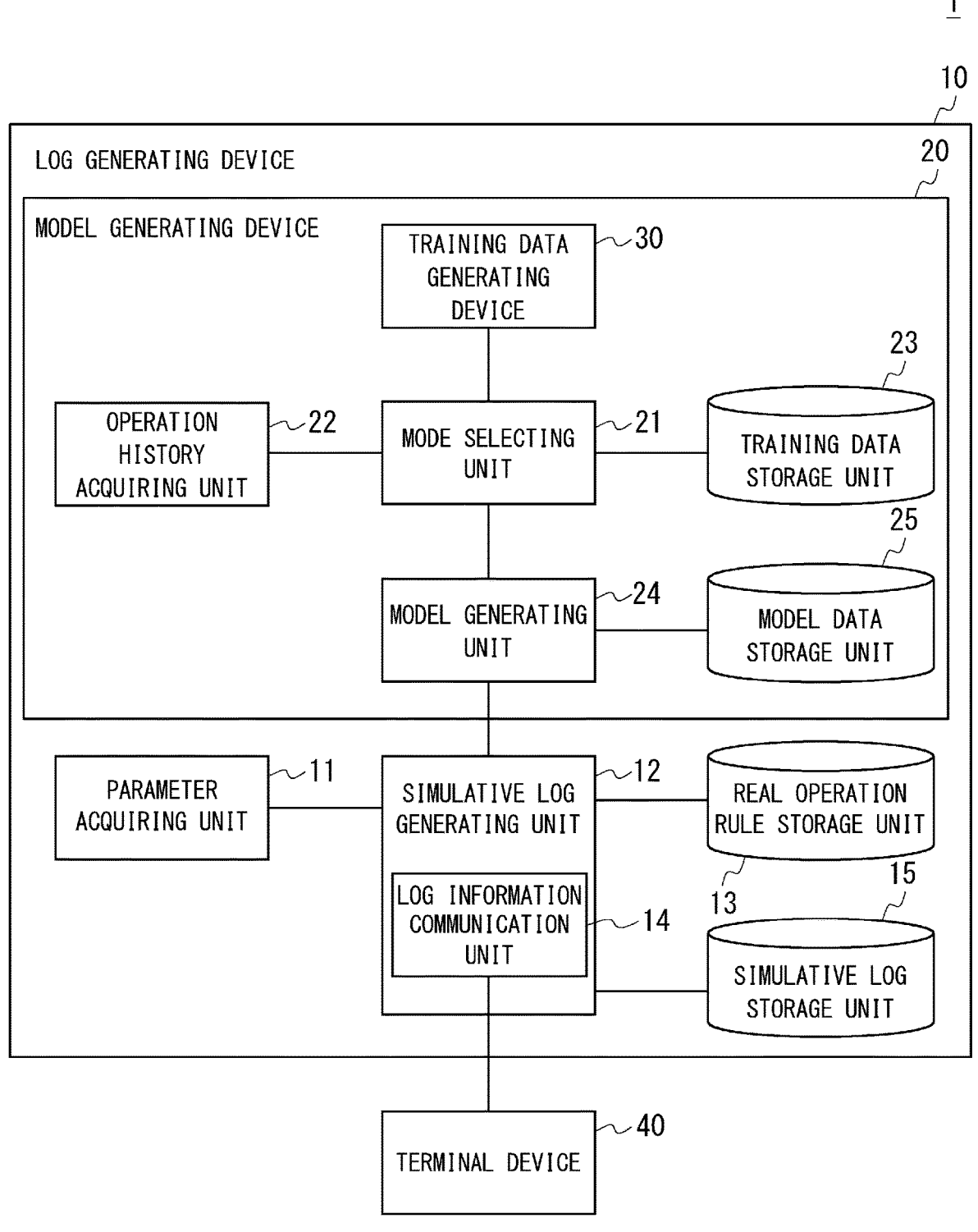
FIG. 2 is a schematic configuration diagram of a log generating system according to a second example embodiment.

Next, a second example embodiment of the present disclosure will be described. One example of a log generating system 1 to which the training data generating system 300 can be applied is shown in FIG. 2. FIG. 2 is a schematic configuration diagram of the log generating system 1 according to the second example embodiment. The log generating system 1 is a computer system that generates simulative log data composed of a simulative log simulating a normal log, which is necessary in a cybersecurity exercise. Herein, a normal log refers to a log concerning an operation performed as part of normal business operations in a set environment. A log refers to a record composed of a plurality of rows of log text. Hereinafter, a target application is referred to as a supplemental application.

The log generating system 1 includes a log generating device 10 and a terminal device 40.

(Log Generating Device 10)

The log generating device 10 is a computer device that includes a model generating device 20 that generates a user operation model. The log generating device 10 estimates a user operation with use of a user operation model generated by the model generating device 20 and generates simulative log data composed of a simulative log concerning a user operation. The log generating device 10 includes, in addition to the model generating device 20, a parameter acquiring unit 11, a simulative log generating unit 12, a real operation rule storage unit 13, and a simulative log storage unit 15.

((Model Generating Device 20))

The model generating device 20 is a computer device that includes a training data generating device 30 that generates training data, and trains a user operation model with use of generated training data. The model generating device 20 includes, in addition to the training data generating device 30, a mode selecting unit 21, an operation history acquiring unit 22, a training data storage unit 23, a model generating unit 24, and a model data storage unit 25.

The mode selecting unit 21 selects a control mode from a normal mode and an expansion mode and controls various constituent elements of the model generating device 20 in accordance with the selected control mode. A normal mode is a control mode in which, with an application for which an operation history can be acquired used as an existing application, training data is generated from the operation history and a user operation model is trained with use of the generated training data. Training data generated and used in a normal mode is referred to as existing training data. An expansion mode is a control mode in which training data for a supplemental application is generated and a user operation model is supplementally trained with use of the generated training data. Training data generated and used in an expansion mode is referred to as supplemental training data.

The training data generating device 30 is a computer device that corresponds to the training data generating system 300 according to the first example embodiment and that, in an expansion mode, generates supplemental training data for a supplemental application. Further details will be provided later.

The operation history acquiring unit 22, in a normal mode, acquires a user operation history of an existing application from an operation history collecting computer (not illustrated) connected to the model generating device 20 via a network. An operation history collecting tool is installed in the operation history collecting computer. With use of the operation history collecting tool, the operation history collecting computer collects a user operation history that a computer generates in response to a user's operating the computer and outputs the collected operation history to the model generating device 20. The operation history acquiring unit 22 generates training data from an acquired user operation history or stores the operation history into the training data storage unit 23 as training data.

The training data storage unit 23 stores and accumulates training data.

The model generating unit 24, in a normal mode, generates a trained user operation model by training a user operation model with use of existing training data. The model generating unit 24, in an expansion mode, expands a user operation model by supplementally training a user operation model with use of supplemental training data.

The model data storage unit 25 stores model data that includes various parameters of a user operation model trained by existing training data, and an application list containing, in a list form, identification information of applications corresponding to the user operation model. Identification information of an application is referred to as an application ID and indicates a type of the application. An application ID is, for example, an application name. In a case in which a user operation model has been expanded in an expansion mode, the model data storage unit 25 stores model data of the expanded user operation model and an application list to which a supplemental application has been added.

((Other Constituent Elements of Log Generating Device 10))

The parameter acquiring unit 11 acquires a system parameter to be used in a process performed by the simulative log generating unit 12. Examples of such system parameters include a computer name, a username, an IP address, a log generation starting time, or a log generation ending time. A system parameter is, for example, created by an administrator of the log generating device 10 and then input via the administrator's terminal or the like.

The simulative log generating unit 12 estimates a user operation with use of a generated user operation model. The simulative log generating unit 12 then generates simulative log data based on the estimated user operation and an application ID.

In the second example embodiment, the simulative log generating unit 12 converts a user operation estimated by a user operation model into an operation command to cause that user operation to be executed in the terminal device 40 in which the corresponding application is installed. In other words, an operation command is an operation command that corresponds to a user operation and to an application ID. When converting a user operation into an operation command, a real operation template, a template of an operation command, is used. The simulative log generating unit 12 transmits, via a log information communication unit 14, the operation command to the terminal device 40 in which the corresponding application is installed. Then, the simulative log generating unit 12 receives, via the log information communication unit 14, log data composed of a log that the terminal device 40 generates when the operation command is executed, as simulative log data composed of a simulative log concerning the user operation. The simulative log generating unit 12 stores the received simulative log data into the simulative log storage unit 15.

The log information communication unit 14 is included in the simulative log generating unit 12 and carries out data communication between the simulative log generating unit 12 and the terminal device 40.

In this manner, the simulative log generating unit 12 collects simulative log data from the terminal device 40, and thus, if an application concerning a user operation model is installed in the terminal device 40, the simulative log generating unit 12 can generate simulative log data similar to an actual normal log with ease.

The real operation rule storage unit 13 stores a real operation template corresponding to a user operation for each application.

The simulative log storage unit 15 stores and accumulates acquired simulative log data.

(Terminal Device 40)

The terminal device 40 is a computer terminal device that carries out data communication with the log information communication unit 14 of the log generating device 10. The terminal device 40 executes an operation command received from the log information communication unit 14, collects a log generated in response to the execution, and transmits the collected log to the log information communication unit 14 of the log generating device 10 as log data.

Figure 3:
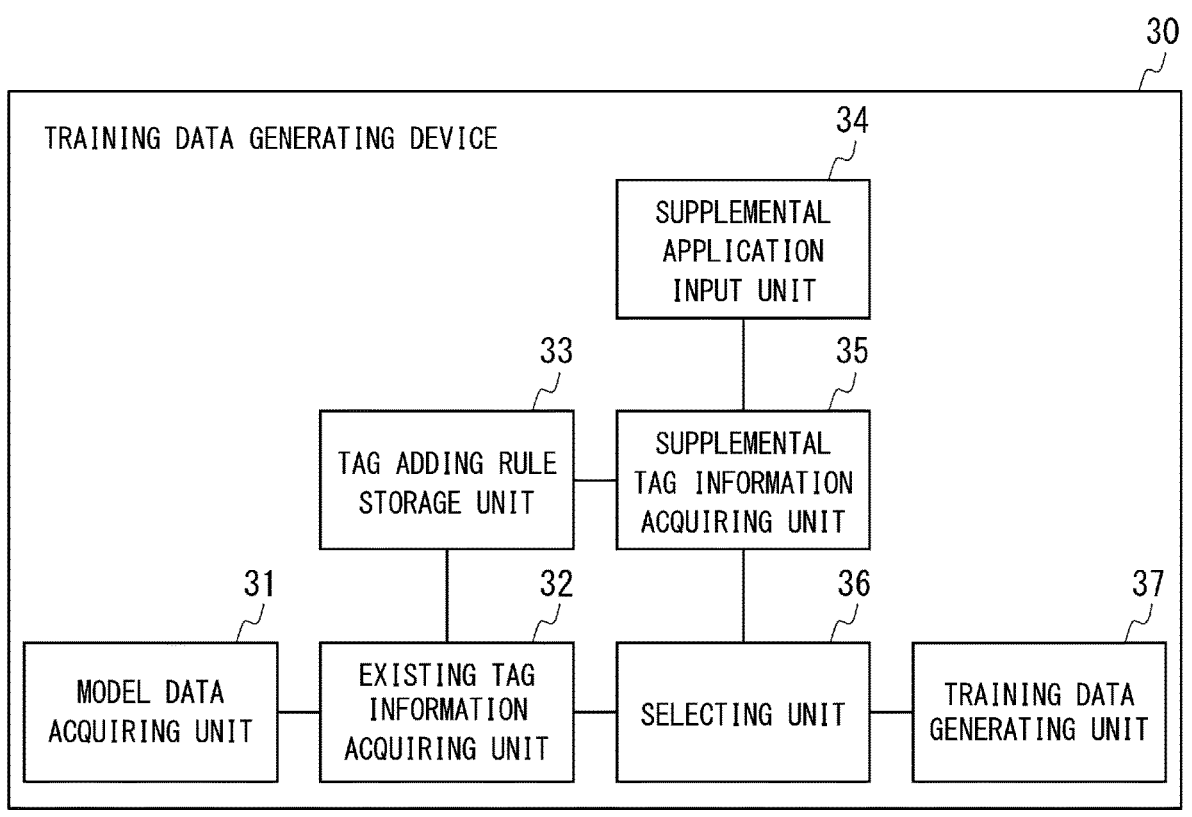
FIG. 3 is a block diagram showing a configuration of a training data generating device according to the second example embodiment.

FIG. 3 is a block diagram showing a configuration of the training data generating device 30 according to the second example embodiment. The training data generating device 30 includes a model data acquiring unit 31, an existing tag information acquiring unit 32, a tag adding rule storage unit 33, a supplemental application input unit 34, a supplemental tag information acquiring unit 35, a selecting unit 36, and a training data generating unit 37.

The model data acquiring unit 31 acquires existing training data from the training data storage unit 23 and acquires an application list from the model data storage unit 25. The model data acquiring unit 31 supplies an application list to the existing tag information acquiring unit 32 and supplies existing training data to the training data generating unit 37.

The existing tag information acquiring unit 32 corresponds to the existing tag information acquiring unit 320 of the first example embodiment. The existing tag information acquiring unit 32 identifies an application ID of an existing application based on an application list. The existing tag information acquiring unit 32 then acquires, from the tag adding rule storage unit 33, existing tag information corresponding to an application ID of each existing application. In other words, the existing tag information acquiring unit 32 refers to the tag adding rule storage unit 33 and adds tag information regarding each existing application. The existing tag information acquiring unit 32 then supplies the acquired existing tag information to the selecting unit 36.

The tag adding rule storage unit 33 stores predefined tag information for each application.

The supplemental application input unit 34 receives input of an application ID of a supplemental application from an administrator of the log generating system 1. The supplemental application input unit 34 supplies an application ID of a supplemental application to the supplemental tag information acquiring unit 35.

The supplemental tag information acquiring unit 35 corresponds to the target tag information acquiring unit 350 according to the first example embodiment. The supplemental tag information acquiring unit 35 acquires tag information corresponding to an application ID of a supplemental application from the tag adding rule storage unit 33 as supplemental tag information. In other words, the supplemental tag information acquiring unit 35 refers to the tag adding rule storage unit 33 and adds tag information regarding a supplemental application. The supplemental tag information acquiring unit 35 supplies the acquired supplemental tag information to the selecting unit 36.

The selecting unit 36 corresponds to the selecting unit 360 according to the first example embodiment. The selecting unit 36 calculates the degree of similarity between supplemental tag information and each piece of existing tag information. The degree of similarity between supplemental tag information and each piece of existing tag information corresponds to the degree of similarity between a supplemental application and each existing application. The selecting unit 36 then selects an existing application having a high degree of similarity to the supplemental application as a similar application. The selecting unit 36 supplies the application ID of the similar application to the training data generating unit 37.

The training data generating unit 37 corresponds to the training data generating unit 370 according to the first example embodiment. The training data generating unit 37 extracts, from existing training data acquired from the model data acquiring unit 31, training data for a similar application as source training data. The training data generating unit 37 then generates supplemental training data from the source training data. Specifically, the training data generating unit 37 converts an application ID of the similar application of the source training data into a supplemental application ID and, as a result thereof, generates supplemental training data. The training data generating unit 37 stores generated supplemental training data into the training data storage unit 23.

In the second example embodiment, a user operation model is a recurrent neural network (RNN) model. A user operation model is not limited thereto and may instead be a Markov model. A user operation model accepts input of information indicating a combination of an application type and a user operation type and outputs information indicating a combination of an application type and a user operation type or outputs the probability of each combination. Such a user operation model makes it possible to estimate a user operation in consideration of not merely a tendency of a user operation for each application but a relation between different applications.

FIG. 4 shows one example of a data structure of training data according to the second example embodiment. The training data shown in this figure is time-series data of information indicating a combination of an application type and a user operation type and is also referred to as operation-series data. Specifically, in the training data, the time, an application ID, a user operation classification, and a user operation target are associated with one another. Herein, a user operation type is determined by a combination of a user operation classification and a user operation target. For example, a user performs an operation of "Edit File" (editing) on the file "C:¥Users¥UN¥Documents¥example.docx" in the application "APP6" at the time "2020/01/10 12:34:01." Thereafter, the user performs an operation of "Open" (opening) on the file "https://hoge.com" in the application "APP2" at the time "2020/01/10 12:34:05."

FIG. 5 shows one example of a data structure of an application list according to the second example embodiment. An application list contains, in a list form, application IDs of applications for which a user operation model can estimate a user operation, that is, application IDs of existing applications. In this figure, the application list includes application IDs APP1 to APP8 of eight applications. The number of applications, however, is not limited thereto. An application list may be generated by extracting application IDs from existing training data and arranging the extracted application IDs in a list form.

FIG. 6 shows one example of a data structure of the real operation rule storage unit 13 according to the second example embodiment. The real operation rule storage unit 13 stores an application ID, a user operation ID indicating a user operation type, and a real operation template with these pieces of information mapped to one another.

The simulative log generating unit 12 selects a real operation template based on a combination of an application ID and a user operation ID. The simulative log generating unit 12 then generates an operation command by embedding a parameter acquired by the parameter acquiring unit 11 into the selected real operation template.

FIG. 7 shows one example of a data structure of the tag adding rule storage unit 33 according to the second example embodiment. The tag adding rule storage unit 33 stores an application ID and tag information defined in advance for that application with these pieces of information mapped to each other. Tag information includes a certain number of individual tags defined in advance by an administrator or an engineer of the application.

Each individual tag indicates the purpose of use of the application, the frequency of use of the application, the means of use of the application, or any of other features. Examples of information indicating the purpose of use include that the application is used, for example, to edit text data or to access a web server. Examples of information indicating the frequency of use include that the application is used, for example, daily or sometimes. Examples of information indicating the means of use include, for example, a file format during use or a language used. Example of other features include information indicating the name of a package that includes the application or whether the application is preinstalled.

For example, individual tags defined for the application "APP2" include "Web Browser" indicating the purpose of use, "Daily Used" indicating the frequency of use, and "Preinstalled" as other features.

Figure 8:
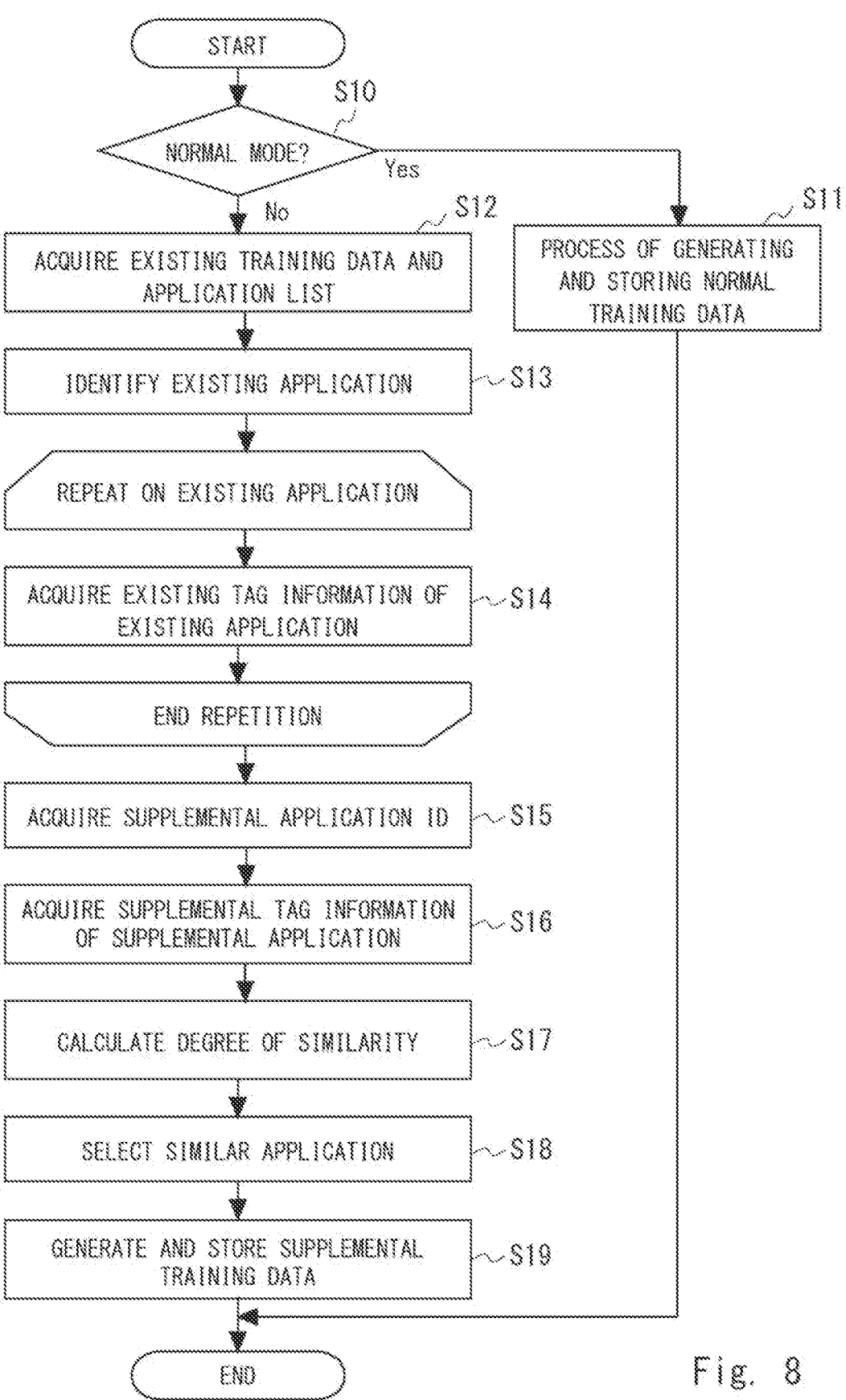
FIG. 8 is a flowchart showing a procedure of a training data generating process according to the second example embodiment.

Next, a training data generating process performed by the model generating device 20 will be described. FIG. 8 is a flowchart showing a procedure of a training data generating process according to the second example embodiment.

First, at step S10, the mode selecting unit 21 of the model generating device 20 determines whether the current mode is a normal mode. If the mode selecting unit 21 determines that the current mode is a normal mode (Yes at step S10), the process proceeds to step S11. At step S11, the operation history acquiring unit 22 executes a process of generating and storing normal training data. Specifically, the operation history acquiring unit 22 acquires a user operation history of an existing application via a network and generates existing training data from the acquired user operation history. The operation history acquiring unit 22 then stores the existing training data into the training data storage unit 23. In this example, the operation history acquiring unit 22 stores the user operation history into the training data storage unit 23 as existing training data without any modification to the user operation history. The model generating device 20 then terminates the process.

Meanwhile, if the mode selecting unit 21 determines that the current mode is not a normal mode but an expansion mode (No at step S10), the process proceeds to step S12. At step S12, the model data acquiring unit 31 of the training data generating device 30 acquires existing training data from the training data storage unit 23 and acquires an application list from the model data storage unit 25. Next, at step S13, the existing tag information acquiring unit 32 identifies an application ID of an existing application based on the application list. Then, the existing tag information acquiring unit 32 repeats the process of step S14 on each existing application.

At step S14, the existing tag information acquiring unit 32 acquires, from the tag adding rule storage unit 33, existing tag information corresponding to the application ID of the existing application.

Next, at step S15, the supplemental application input unit 34 receives input of and acquires an application ID of a supplemental application. At step S16, the supplemental tag information acquiring unit 35 acquires, from the tag adding rule storage unit 33, supplemental tag information corresponding to the application ID of the supplemental application.

As step S17, the selecting unit 36 calculates the degree of similarity between the supplemental tag information and existing tag information. Specifically, the selecting unit 36 compares a set of individual tags in the supplemental tag information against a set of individual tags in each piece of the existing tag information and calculates the degree of similarity between the two sets. Thus, the selecting unit 36 calculates the degree of similarity between the supplemental tag information and each piece of the existing tag information. In one example, the degree of similarity between sets of individual tags is calculated as follows with use of the Dice coefficient.

$$DSC(X, Y) = \frac{2|X \cap Y|}{|X| + |Y|} \qquad \text{[Math. 1]}$$

In the above, X is a set of individual tags included in supplemental tag information of a supplemental application, and Y is a set of individual tags included in existing tag information of an existing application to be compared against. In calculating the degree of similarity between sets of individual tags, the Jaccard coefficient, the Simpson coefficient, or the cosine similarity may also be used, aside from the Dice coefficient.

An individual tag with a higher priority may be given a greater contribution to the degree of similarity between sets of individual tags. For example, the selecting unit 36 may calculate the degree of similarity between sets of individual tags with each individual tag or specified individual tag information given a predetermined weight. Meanwhile, the selecting unit 36 may divide a set of individual tags into a predetermined number of subsets according to the priority, calculate the degree of similarity of each divided subset, and calculate the degree of similarity between the sets of individual tags by, for example, a weighted average with the degree of similarity of each divided subset given a predetermined weight.

Next, at step S18, the selecting unit 36 selects an existing application that corresponds to the existing tag information having a high degree of similarity to the supplemental tag information as a similar application. With this operation, features of the supplemental application can be reflected efficiently onto a user operation model.

FIG. 9 is an illustration for describing one example of a degree of similarity calculating and selecting process according to the second example embodiment. This figure, with a supplemental application being APP5, shows the degree of similarity between tag information of the supplemental application and tag information of each existing application.

As shown in FIG. 7, the tag information of APP5 includes the three individual tags: "Text Editor," "Sometimes Used," and "Open Text File." Meanwhile, the tag information of APP4 includes the four individual tags: "Text Editor," "Frequently Used," "Open Text File," and "Preinstalled." In other words, the tag information of APP5 and the tag information of APP4 share two common individual tags. Therefore, as shown in FIG. 9, the Dice coefficient between the set of individual tags of APP5 and the set of individual tags of APP4, that is, the degree of similarity between the tag information of APP5 and the tag information of APP4 is calculated to be 0.86.

Meanwhile, the tag information of APP5 and the tag information of APP2 do not share any common individual tag. Therefore, the Dice coefficient between the set of individual tags of APP5 and the set of individual tags of APP2, that is, the degree of similarity between the tag information of APP5 and the tag information of APP2 is calculated to be 0.00.

The selecting unit 36 then selects, as a similar application, an existing application that corresponds to the existing tag information having the highest degree of similarity to the supplemental tag information. In this example, the similar application is APP4 having a degree of similarity of tag information of 0.86.

FIG. 10 is an illustration for describing another example of a degree of similarity calculating and selecting process according to the second example embodiment. This figure, with a supplemental application being APP3, shows the degree of similarity between tag information of the supplemental application and tag information of each existing application. In this example as well, the degrees of similarity are calculated as in the case shown in FIG. 9. In this example, the selecting unit 36 selects, as a similar application, an existing application that corresponds to the existing tag information having a degree of similarity to the supplemental tag information of no lower than a predetermined threshold. For example, if the threshold is 0.40, two applications, namely, APP1 having a degree of similarity of 0.40 and APP2 having a degree of similarity of 0.80 are selected as similar applications. Aside from selecting an existing application as described above, the selecting unit 36 may select, as similar applications, a predetermined number of existing applications that correspond to existing tag information whose degree of similarity to supplemental tag information ranks within that predetermined number from the top.

In this example, a plurality of similar applications are selected. The selecting unit 36 may, however, exclude, from the similar applications, any existing application that does not share a predetermined individual tag, such as an individual tag with a high priority, with the supplemental application. In this case, a predetermined individual tag serves as an individual tag used as a criterion for a cutoff determination. In other words, the selecting unit 36 may select, as a similar application, only an existing application corresponding to existing tag information that has a high degree of similarity to supplemental tag information and that shares a predetermined individual tag with the supplemental tag information. For example, the selecting unit 36 sets, of the tag information of APP5, the individual tag "Text Editor" indicating the purpose of use as an individual tag used as a criterion for a cutoff determination. In this case, APP2, which does not include "Text Editor" in its set of individual tags is excluded from similar applications. With this configuration, features of a supplemental application can be reflected onto a user operation model with high accuracy.

At step S19 of FIG. 8, the training data generating unit 37 extracts, from the existing training data, training data for the similar application or applications as source training data and generates, from the source training data, supplemental training data that includes training data for the supplemental application. The training data generating unit 37 then stores the supplemental training data into the training data storage unit 23 and terminates the process.

FIG. 11 is an illustration for describing a supplemental training data generating process according to the second example embodiment. In this figure, a similar application is APP2, and a supplemental application is APP3.

First, the training data generating unit 37 extracts, from existing training data, operation-series data indicating the contents of a series of operations including an operation on a similar application and makes a copy of that operation-series data. Herein, the operation-series data from which a copy is made is referred to as operation-series data A and a copy of the operation-series data is referred to as operation-series data B. As shown in FIG. 11, the contents of the operation-series data A include, in addition to the operation on the similar application, operations on other than the similar application performed before and after the operation on the similar application.

The training data generating unit 37 locates the application ID "APP2" of the similar application in the operation-series data B and replaces the application ID "APP2" of the similar application with the application ID "APP3" of the supplemental application. The training data generating unit 37 stores the operation-series data B in which the application ID has been replaced into the training data storage unit 23 as supplemental training data for supplementally training the user operation model having trained by the existing training data.

If the selecting unit 36 selects a plurality of similar applications at step S18, the training data generating unit 37 may execute the process of step S19 on each of the plurality of similar applications. With this configuration, features of the plurality of similar applications can be reflected onto a user operation model, and the estimation accuracy of the user operation model can be improved. Furthermore, in the above case, the training data generating unit 37 may, with respect to each of the plurality of similar applications, generate supplemental training data from, of the source training data, training data that corresponds to the similar application in an amount corresponding to the degree of similarity. For example, in the example shown in FIG. 10, if the two applications APP1 having a degree of similarity of 0.40 and APP2 having a degree of similarity of 0.80 are selected as similar applications, the process of generating supplemental training data is performed as follows. First, the training data generating unit 37 extracts, from existing training data, N1 pieces of operation-series data that include an operation on APP1 and N2 pieces of operation-series data that include an operation on APP2. At this point, the training data generating unit 37 adjusts the number of pieces of data to extract such that N1:N2=0.40:0.80=1:2 is satisfied. The training data generating unit 37 then executes the process of step S19 on each of APP1 and APP2 with use of the extracted operation-series data and designates the generated training data collectively as supplemental training data. With this configuration, features of a plurality of similar applications can be reflected onto a user operation model with the stress on each feature varied according to the degree of similarity, making it possible to further improve the estimation accuracy of the user operation model.

Figure 12:
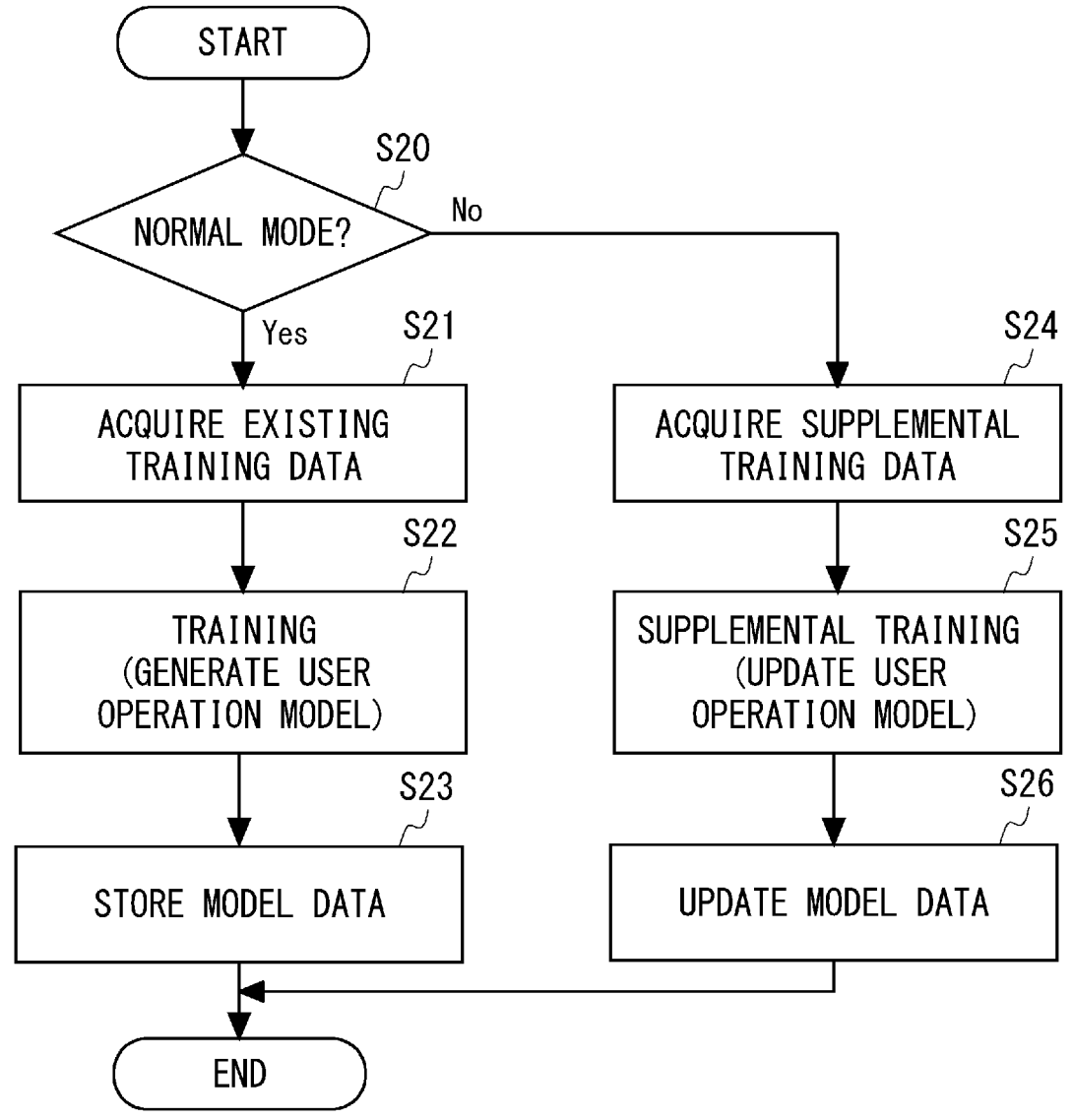
FIG. 12 is a flowchart showing a procedure of a model generating process according to the second example embodiment.

FIG. 12 is a flowchart showing a procedure of a model generating process according to the second example embodiment.

First, the mode selecting unit 21 of the model generating device 20 determines whether the control mode is a normal mode (step S20). If the control mode is a normal mode (Yes at step S20), the model generating unit 24 acquires existing training data from the training data storage unit 23 (step S21). Next, the model generating unit 24 acquires model data of a user operation model from the model data storage unit 25 and trains the user operation model with use of the existing training data (step S22). Thus, a trained user operation model is generated. Upon the completion of the training, the model generating unit 24 stores model data of the trained user operation model into the model data storage unit 25 (step S23). At this point, the model generating unit 24 may generate an application list and stores the application list, along with the model data, into the model data storage unit 25.

Meanwhile, if the control mode is not a normal mode, that is, if the control mode is an expansion mode (No at step S20), the model generating unit 24 acquires supplemental training data from the training data storage unit 23 (step S24). Next, the model generating unit 24 acquires model data of a user operation model trained by existing training data from the model data storage unit 25 and performs supplemental training on the user operation model with use of the supplemental training data (step S25). Thus, the user operation model is updated. Upon the completion of the supplemental training, the model generating unit 24 stores model data of the supplementally trained user operation model into the model data storage unit 25 (step S26). At this point, the model generating unit 24 may overwrite model data. Furthermore, the model generating unit 24 may update an application list and store the updated application list into the model data storage unit 25.

In the foregoing description, in an expansion mode, the model generating unit 24 supplementally trains the user operation model trained by the existing training data, with use of the supplemental training data. This example, however, is not limiting, and the model generating unit 24 may merge (integrate) supplemental training data into existing training data and retrain a user operation model with use of the merged existing training data. Supplemental training is preferable to retraining in that the training time can be shortened.

Figure 13:
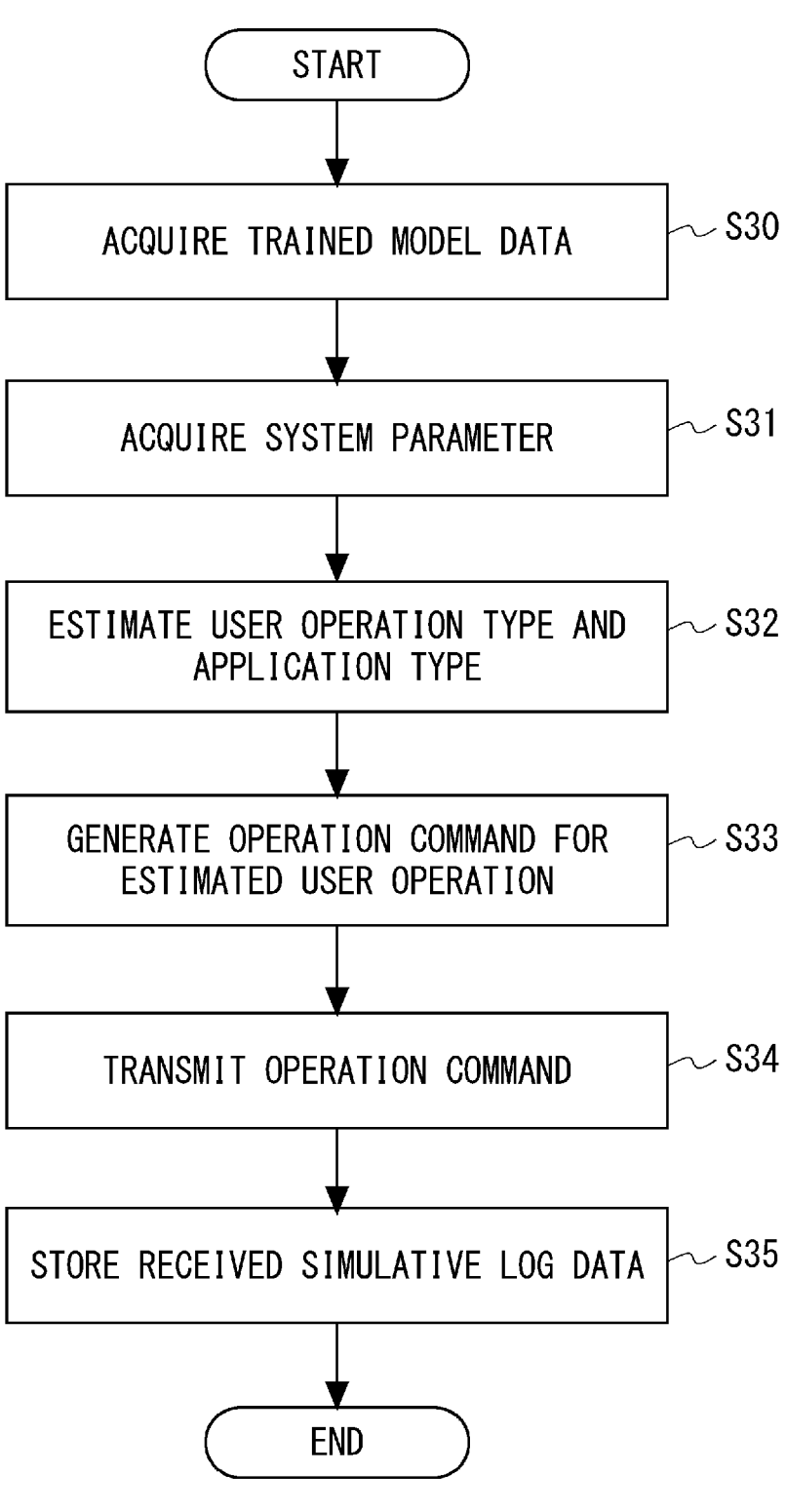
FIG. 13 is a flowchart showing a procedure of a log generating process according to the second example embodiment.

FIG. 13 is a flowchart showing a procedure of a log generating process according to the second example embodiment.

First, the simulative log generating unit 12 of the log generating device 10 acquires model data of a trained or supplementally trained user operation model from the model data storage unit 25 (step S30). Next, the simulative log generating unit 12 acquires a system parameter via the parameter acquiring unit 11 (step S31). With use of the user operation model, the simulative log generating unit 12 estimates a combination of a next occurring application ID and a next occurring user operation ID (step S32). Next, the simulative log generating unit 12 acquires a real operation template corresponding to the estimated application ID and user operation ID from the real operation rule storage unit 13 and generates an operation command by applying the system parameter to the real operation template (step S33). Next, the simulative log generating unit 12 transmits the generated operation command to the terminal device 40 via the log information communication unit 14 (step S34). The simulative log generating unit 12 stores simulative log data generated when the operation command is executed and sent from the terminal device 40 via the log information communication unit 14 into the simulative log storage unit 15 (step S35).

In this manner, according to the second example embodiment, the training data generating device 30 makes use of a user operation tendency of a similar application having set therein tag information similar to the tag information of a supplemental application for the supplemental application. The training data generating device 30 does so because applications having, for example, a similar purpose of use, frequency of use, means of use are highly likely to have a similar user operation tendency. Configured in this manner, the training data generating device 30 provides advantageous effects similar to those provided by the training data generating system 300 according to the first example embodiment.

In the second example embodiment, a user operation model is a model that takes a relation between applications into consideration as well. Therefore, with the expansion of a user operation model, a model that takes into consideration a relation between a supplemental application and another application can be generated with ease.

A user operation model can be expanded, instead of by the technique of the second example embodiment in which training data for one application is used for another application, by a technique in which, of model data, data for a similar application is copied for use as data for a supplemental application. However, employing such a technique is difficult if a user operation model is a model in which the probability value of each application is not expressed explicitly or discretely as in a neural network, and in such a case in particular, the technique of the second example embodiment is effective.

In the second example embodiment, training data is time-series data (operation-series data) of information indicating application types and user operation types. Alternatively, training data may be time-series data of observation symbols converted from log text included in log data. An observation symbol is information for identifying a combination of an application and an individual observation symbol. In this case, a user operation model may be a hidden Markov model that estimates a next occurring user operation and estimates an observation symbol appearing as a result of that user operation. Meanwhile, a user operation model may be a statistical model that selects a next appearing observation symbol according to the probability of appearance of observation symbols. The probability of appearance of observation symbols may be calculated from the time at which each observation symbol has appeared and the number of observation symbols.

In order to generate time-series data of observation symbols converted from log text included in log data, the log generating device 10, for example, executes the following process.

First, the operation history acquiring unit 22 acquires, as a user operation history, log data composed of a group of logs from a log collecting computer (not illustrated) connected to the log generating device 10 via a network. A log collecting tool is installed in the log collecting computer. With use of the log collecting tool, the log collecting computer collects log data generated by a computer and outputs the collected log data to the log generating device 10.

Next, the operation history acquiring unit 22 extracts, from the collected log data, a log type written in the log of the log data and identifies an application ID that corresponds to the log type. To identify an application ID, the operation history acquiring unit 22 may use a predetermined table mapping a log type and an application ID.

The operation history acquiring unit 22 extracts, from the collected log data, a predetermined key written in the log of the log data and identifies an individual observation symbol that corresponds to the predetermined key. An individual observation symbol may also be referred to as an event or an event group. To identify an individual observation symbol, the operation history acquiring unit 22 may use a predetermined table mapping a key type and an individual observation symbol. The log generating device 10 may hold therein a log template mapped to various individual observation symbols in advance and may identify an individual observation symbol by identifying a log template that is close in distance to the collected log data.

The operation history acquiring unit 22 then reads out a timestamp from the collected log data and generates time-series data of observation symbols by arranging the observation symbols in time series.

In this manner, the operation history acquiring unit 22 can generate time-series data of observation symbols from log data. Other processes are basically similar to those performed when operation-series data is used, and thus their description will be omitted with a user operation type read as an individual observation symbol and with a combination of an application ID and a user operation ID read as an observation symbol.

Third Example Embodiment

Next, a third example embodiment of the present disclosure will be described. In the third example embodiment, a log generating device generates log data from a log template, instead of collecting simulative log data from a terminal device via an operation command.

Figure 14:
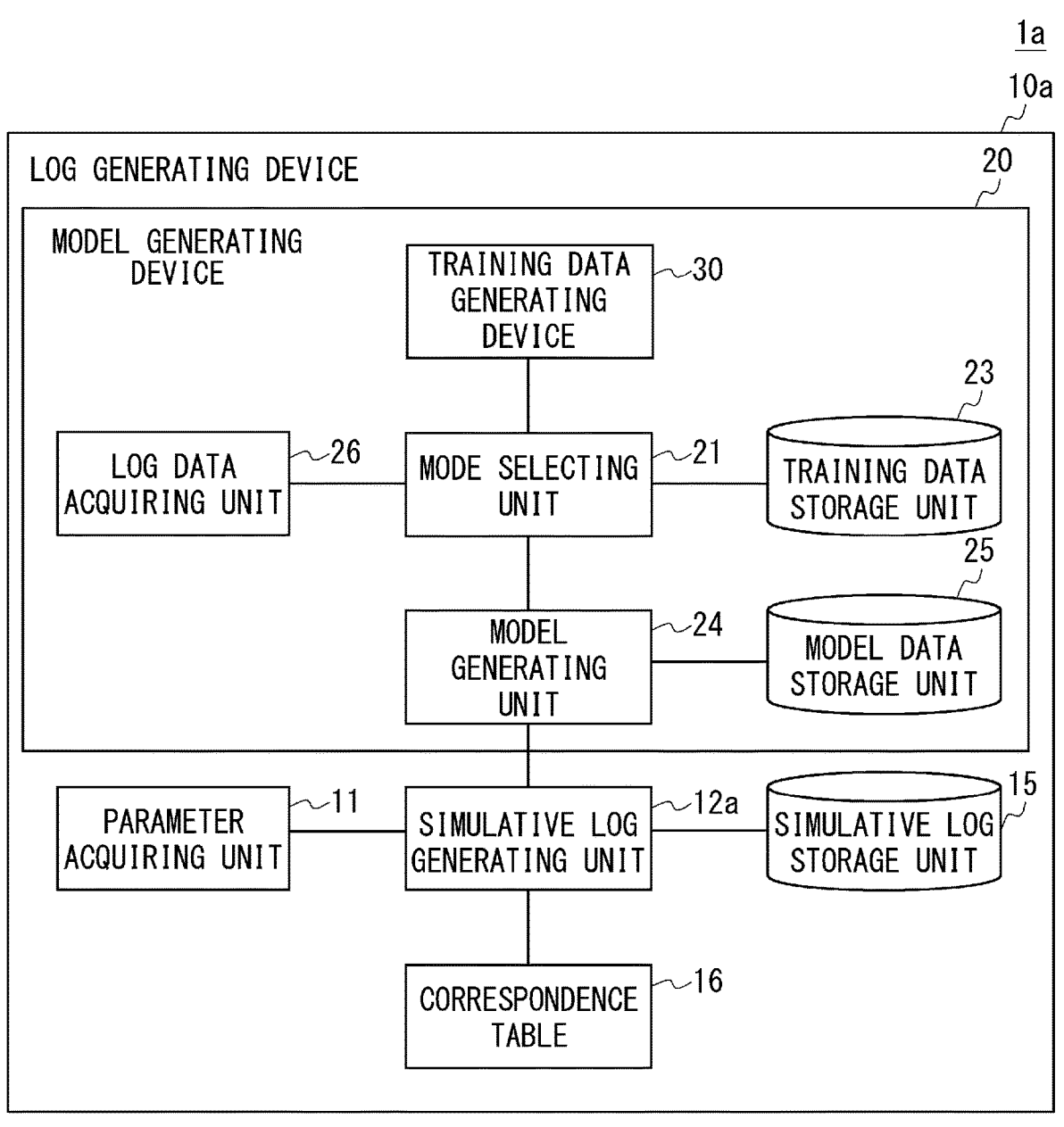
FIG. 14 is a schematic configuration diagram of a log generating system according to a third example embodiment.

FIG. 14 is a schematic configuration diagram of a log generating system 1a according to the third example embodiment. The log generating system 1a has functions basically similar to those of the log generating system 1. The log generating system 1a includes a log generating device 10a in place of the log generating device 10, and the terminal device 40 is omitted.

The log generating device 10a has functions basically similar to those of the log generating device 10. The log generating device 10a includes a simulative log generating unit 12a and a correspondence table 16, in place of the simulative log generating unit 12. The simulative log generating unit 12a differs from the simulative log generating unit 12 in that the simulative log generating unit 12a does not include the log information communication unit 14.

The simulative log generating unit 12a estimates a user operation by a user operation model. With use of the correspondence table 16, the simulative log generating unit 12a then identifies a log template based on a combination of an application ID and a user operation ID. The simulative log generating unit 12a generates simulative log data by applying a system parameter to the log template.

FIG. 15 shows one example of a data structure of a correspondence table according to the third example embodiment. The correspondence table 16 maps an application ID, a user operation ID, and a log template to one another.

In this manner, with use of the correspondence table 16, the simulative log generating unit 12a can generate simulative log data with ease without transmitting or receiving an operation command and simulative log data to or from a terminal device.

Figure 16:
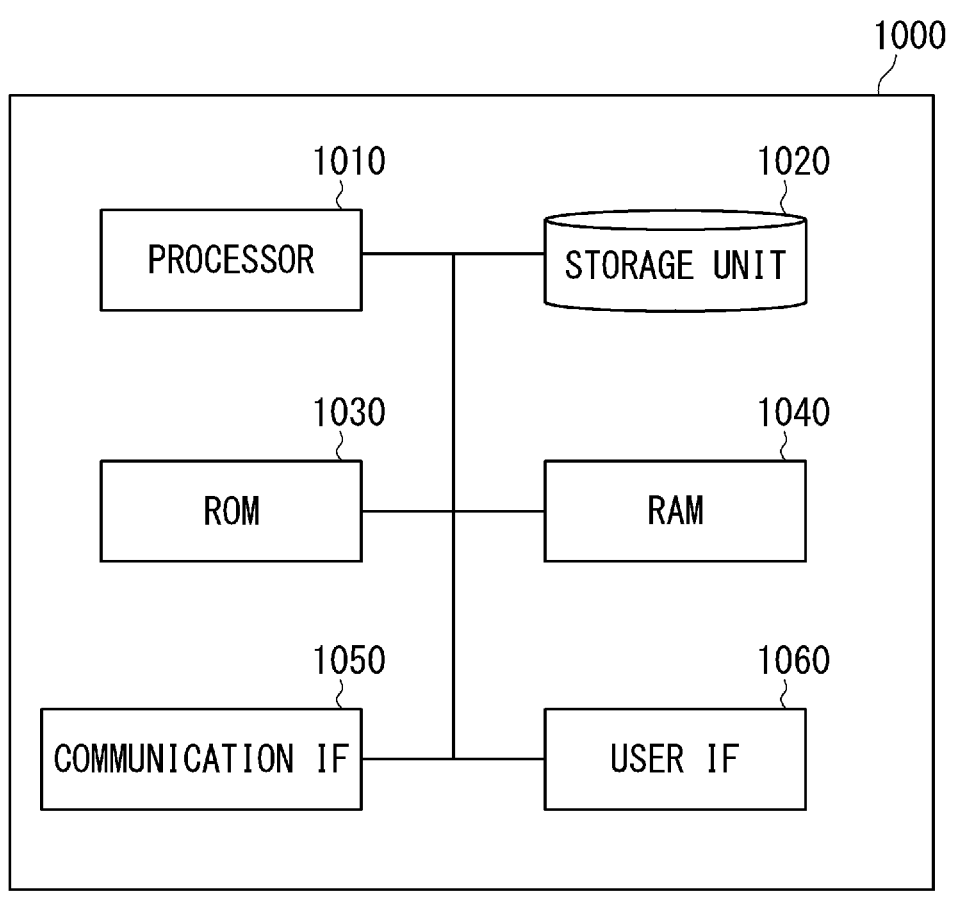
FIG. 16 shows an example of a configuration of a computer that may be used as a training data generating device, a model generating device, or a log generating device.

Next, a physical configuration of a training data generating device, a model generating device, or a log generating device will be described. FIG. 16 shows an example of a configuration of a computer that may be used as a training data generating device, a model generating device, or a log generating device. A computer 1000 includes a processor 1010, a storage unit 1020, a read-only memory (ROM) 1030, a random-access memory (RAM) 1040, a communication interface (IF) 1050, and a user interface 1060.

The communication interface 1050 is an interface for connecting the computer 1000 to a communication network via a wired communication means or a wireless communication means. The user interface 1060 includes, for example, a display unit, such as a display. The user interface 1060 further includes an input unit, such as a keyboard, a mouse, or a touch panel.

The storage unit 1020 is an auxiliary storage device that can hold various types of data. The storage unit 1020 need not be a part of the computer 1000 and may be an external storage device or a cloud storage connected to the computer 1000 via a network.

The ROM 1030 is a nonvolatile storage device. For the ROM 1030, for example, a relatively low-capacity semiconductor storage device, such as a flash memory, is used. A program that the processor 1010 executes may be stored in the storage unit 1020 or the ROM 1030. The storage unit 1020 or the ROM 1030 stores various programs for implementing functions of each unit of, for example, a training data generating device, a model generating device, or a log generating device.

Such a program can be stored with use of various types of non-transitory computer-readable media and supplied to the computer 1000. Non-transitory computer-readable media include various types of tangible storage media. Examples of such non-transitory computer-readable media include a magnetic recording medium, such as a flexible disk, a magnetic tape, or a hard disk; a magneto-optical recording medium, such as a magneto-optical disk; an optical disc medium, such as a compact disc (CD) or a digital versatile disc (DVD); and a semiconductor memory, such as a mask ROM, a programmable ROM (PROM), an erasable PROM (EPROM), a flash ROM, or a RAM. Alternatively, a program may be supplied to a computer with use of various types of transitory computer-readable media. Examples of such transitory computer-readable media include an electric signal, an optical signal, and an electromagnetic wave. A transitory computer-readable medium can supply a program to a computer via a wired communication line, such as an electric wire or an optical fiber, or via a wireless communication line.

The RAM 1040 is a volatile storage device. For the RAM 1040, any of various semiconductor memory devices, such as a dynamic random-access memory (DRAM) or a static random-access memory (SRAM), is used. The RAM 1040 may be used as an internal buffer that temporarily stores data and so forth. The processor 1010 loads a program stored in the storage unit 1020 or the ROM 1030 onto the RAM 1040 and executes the program. The processor 1010 may be a central processing unit (CPU) or a graphics processing unit (GPU). As the processor 1010 executes a program, functions of each unit of a training data generating device, a model generating device, or a log generating device may be implemented. The processor 1010 may include an internal buffer that can temporarily store data and so forth.

The present invention is not limited by the foregoing example embodiments, and modifications can be made, as appropriate, within the scope that does not depart from the technical scope and spirit.

Part or the whole of the foregoing example embodiments can also be expressed as in the following supplementary notes, which are not limiting.

Supplementary Note 1

A training data generating system comprising:

existing tag information acquiring means configured to identify, as an existing application, an application for which training data for generating a user operation model that estimates a user operation in an application has already been generated based on a user operation history, and, for each existing application, acquire tag information indicating a feature of the existing application as existing tag information;

target tag information acquiring means configured to, for a target application, acquire tag information indicating a feature of the target application as target tag information;

selecting means configured to calculate a degree of similarity between the target tag information and each piece of the existing tag information, and select, from the existing applications, an application similar to the target application based on the degree of similarity between them; and training data generating means configured to generate training data for the target application from training data for the similar application.

Supplementary Note 2

The training data generating system according to Supplementary Note 1, wherein the existing tag information and the target tag information each include one or more predefined individual tags each classifying a feature of the corresponding application, and the selecting means is configured to calculate the degree of similarity between the target tag information and each piece of the existing tag information by calculating a degree of similarity between a set of individual tags in the target tag information and a set of individual tags in each piece of the existing tag information.

Supplementary Note 3

The training data generating system according to Supplementary Note 2, wherein the selecting means is configured to calculate the degree of similarity between the set of individual tags in the target tag information and the set of individual tags in each piece of the existing tag information with a predetermined weight given to a specified individual tag.

Supplementary Note 4

The training data generating system according to any one of Supplementary Notes 1 to 3, wherein the selecting means is configured to select, as the similar application, one or more existing applications corresponding to existing tag information having a degree of similarity to the target tag information of no smaller than a predetermined value, and with regard to each of a plurality of the similar applications, the training data generating means is configured to generate an amount of the training data for the target application from the training data for the similar application corresponding to the degree of similarity.

Supplementary Note 5

The training data generating system according to any one of Supplementary Notes 1 to 4, wherein the selecting means is configured to select, as the similar application, an existing application corresponding to existing tag information having a degree of similarity to the target tag information of no smaller than a predetermined value and sharing a predetermined individual tag with the target tag information.

Supplementary Note 6

The training data generating system according to any one of Supplementary Notes 1 to 3, wherein the selecting means is configured to select, as the similar application, an existing application corresponding to existing tag information having a highest degree of similarity to the target tag information.

Supplementary Note 7

The training data generating system according to any one of Supplementary Notes 1 to 6, wherein the training data generating means is configured to convert identification information of the similar application included in the training data for the similar application to identification information of the target application and, as a result, generate the training data for the target application.

Supplementary Note 8

The training data generating system according to any one of Supplementary Notes 1 to 7, wherein the user operation model outputs information indicating a combination of an application type and a user operation type, time-series data of information indicating combinations of application types and user operation types used as training data.

Supplementary Note 9

A model generating system comprising:

the training data generating system according to any one of Supplementary Notes 1 to 8, wherein the model generating system is configured to train the user operation model by use of the generated training data.

Supplementary Note 10

A log generating system comprising:
the model generating system according to Supplementary
Note 9,
wherein the log generating system is configured to esti-
mate a user operation by use of the generated user
operation model and generate a simulative log of the
user operation.

Supplementary Note 11

The log generating system according to Supplementary
Note 10, wherein
the log generating system is configured to
convert a user operation estimated by use of the user
operation model into an operation command corre-
sponding to application identification information
that corresponds to the user operation,
transmit the operation command to a terminal device in
which the application is installed, and
receive a log corresponding to the operation command
from the terminal device as the simulative log of the
user operation.

Supplementary Note 12

A training data generating method comprising:
an existing tag information acquiring step of identifying,
as an existing application, an application for which
training data for generating a user operation model that
estimates a user operation in an application has already
been generated based on a user operation history, and,
for each existing application, acquiring tag information
indicating a feature of the existing application as exist-
ing tag information;
a target tag information acquiring step of, for a target
application, acquiring tag information indicating a fea-
ture of the target application as target tag information;
a selecting step of calculating a degree of similarity
between the target tag information and each piece of the
existing tag information, and selecting, from the exist-
ing applications, an application similar to the target
application based on the degree of similarity between
them; and
a training data generating step of generating training data
for the target application from training data for the
similar application.

Supplementary Note 13

A non-transitory computer-readable medium storing a
program that causes a computer to execute:
an existing tag information acquiring process of identi-
fying, as an existing application, an application for
which training data for generating a user operation
model that estimates a user operation in an application
has already been generated based on a user operation
history, and, for each existing application, acquiring tag
information indicating a feature of the existing appli-
cation as existing tag information;
a target tag information acquiring process of, for a target
application, acquiring tag information indicating a fea-
ture of the target application as target tag information;
a selecting process of calculating a degree of similarity
between the target tag information and each piece of the
existing tag information, and selecting, from the existing applications, an application similar to the target
application based on the degree of similarity between
them; and
a training data generating process of generating training
data for the target application from training data for the
similar application.

REFERENCE SIGNS LIST

1, 1a LOG GENERATING SYSTEM
10, 10a LOG GENERATING DEVICE
11 PARAMETER ACQUIRING UNIT
12, 12a SIMULATIVE LOG GENERATING UNIT
13 REAL OPERATION RULE STORAGE UNIT
14 LOG INFORMATION COMMUNICATION UNIT
15 SIMULATIVE LOG STORAGE UNIT
16 CORRESPONDENCE TABLE
20 MODEL GENERATING DEVICE (MODEL GEN-
ERATING SYSTEM)
21 MODE SELECTING UNIT
22 OPERATION HISTORY ACQUIRING UNIT
23 TRAINING DATA STORAGE UNIT
24 MODEL GENERATING UNIT
25 MODEL DATA STORAGE UNIT
30 TRAINING DATA GENERATING DEVICE
(TRAINING DATA GENERATING SYSTEM)
31 MODEL DATA ACQUIRING UNIT
32 EXISTING TAG INFORMATION ACQUIRING
UNIT
33 TAG ADDING RULE STORAGE UNIT
34 SUPPLEMENTAL APPLICATION INPUT UNIT
35 SUPPLEMENTAL TAG INFORMATION ACQUIR-
ING UNIT
36 SELECTING UNIT
37 TRAINING DATA GENERATING UNIT
40 TERMINAL DEVICE
300 TRAINING DATA GENERATING SYSTEM
320 EXISTING TAG INFORMATION ACQUIRING
UNIT
350 TARGET TAG INFORMATION ACQUIRING
UNIT
360 SELECTING UNIT
370 TRAINING DATA GENERATING UNIT
1000 COMPUTER
1010 PROCESSOR
1020 STORAGE UNIT
1030 ROM
1040 RAM
1050 COMMUNICATION INTERFACE
1060 USER INTERFACE

What is claimed is:
1. A training data generating system comprising:
existing tag information acquiring means configured to
identify, as an existing application, an application for
which training data for generating a user operation
model that estimates a user operation in an application
has already been generated based on a user operation
history, and, for each existing application, acquire tag
information indicating a feature of the existing appli-
cation as existing tag information;
target tag information acquiring means configured to, for
a target application, acquire tag information indicating
a feature of the target application as target tag infor-
mation;
selecting means configured to calculate a degree of simi-
larity between the target tag information and each piece
of the existing tag information, and select, from the existing applications, an application similar to the target application based on the degree of similarity between them; and training data generating means configured to generate training data for the target application from training data for the similar application.

2. The training data generating system according to claim 1, wherein the existing tag information and the target tag information each include one or more predefined individual tags each classifying a feature of the corresponding application, and the selecting means is configured to calculate the degree of similarity between the target tag information and each piece of the existing tag information by calculating a degree of similarity between a set of individual tags in the target tag information and a set of individual tags in each piece of the existing tag information.

3. The training data generating system according to claim 2, wherein the selecting means is configured to calculate the degree of similarity between the set of individual tags in the target tag information and the set of individual tags in each piece of the existing tag information with a predetermined weight given to a specified individual tag.

4. The training data generating system according to claim 1, wherein the selecting means is configured to select, as the similar application, one or more existing applications corresponding to existing tag information having a degree of similarity to the target tag information of no smaller than a predetermined value, and with regard to each of a plurality of the similar applications, the training data generating means is configured to generate an amount of the training data for the target application from the training data for the similar application corresponding to the degree of similarity.

5. The training data generating system according to claim 1, wherein the selecting means is configured to select, as the similar application, an existing application corresponding to existing tag information having a degree of similarity to the target tag information of no smaller than a predetermined value and sharing a predetermined individual tag with the target tag information.

6. The training data generating system according to claim 1, wherein the selecting means is configured to select, as the similar application, an existing application corresponding to existing tag information having a highest degree of similarity to the target tag information.

7. The training data generating system according to claim 1, wherein the training data generating means is configured to convert identification information of the similar application included in the training data for the similar application to identification information of the target application and, as a result, generate the training data for the target application.

8. The training data generating system according to claim 1, wherein the user operation model outputs information indicating a combination of an application type and a user operation type, time-series data of information indicating combinations of application types and user operation types used as training data.

9. A model generating system comprising:

the training data generating system according to claim 1, wherein the model generating system is configured to train the user operation model by use of the generated training data.

10. A log generating system comprising:

the model generating system according to claim 9, wherein the log generating system is configured to estimate a user operation by use of the generated user operation model and generate a simulative log of the user operation.

11. The log generating system according to claim 10, wherein the log generating system is configured to convert a user operation estimated by use of the user operation model into an operation command corresponding to application identification information that corresponds to the user operation, transmit the operation command to a terminal device in which the application is installed, and receive a log corresponding to the operation command from the terminal device as the simulative log of the user operation.

12. A training data generating method comprising:

an existing tag information acquiring step of identifying, as an existing application, an application for which training data for generating a user operation model that estimates a user operation in an application has already been generated based on a user operation history, and, for each existing application, acquiring tag information indicating a feature of the existing application as existing tag information;

a target tag information acquiring step of, for a target application, acquiring tag information indicating a feature of the target application as target tag information;

a selecting step of calculating a degree of similarity between the target tag information and each piece of the existing tag information, and selecting, from the existing applications, an application similar to the target application based on the degree of similarity between them; and a training data generating step of generating training data for the target application from training data for the similar application.

13. A non-transitory computer-readable medium storing a program that causes a computer to execute:

an existing tag information acquiring process of identifying, as an existing application, an application for which training data for generating a user operation model that estimates a user operation in an application has already been generated based on a user operation history, and, for each existing application, acquiring tag information indicating a feature of the existing application as existing tag information;

a target tag information acquiring process of, for a target application, acquiring tag information indicating a feature of the target application as target tag information;

a selecting process of calculating a degree of similarity between the target tag information and each piece of the existing tag information, and selecting, from the existing applications, an application similar to the target application based on the degree of similarity between them; and a training data generating process of generating training data for the target application from training data for the similar application.

\* \* \* \* \*